June 9, 1959     R. L. KERR     2,890,066
NON-ROTATABLE EXPANSION COUPLING
Filed Aug. 20, 1956
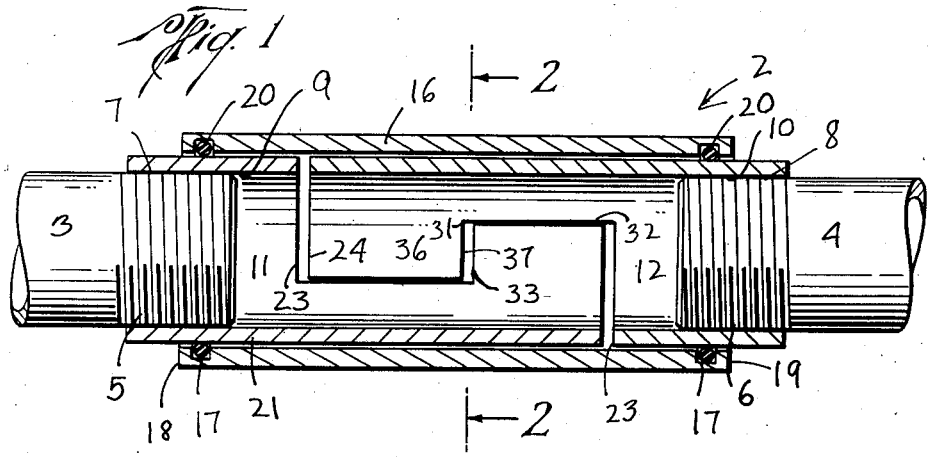
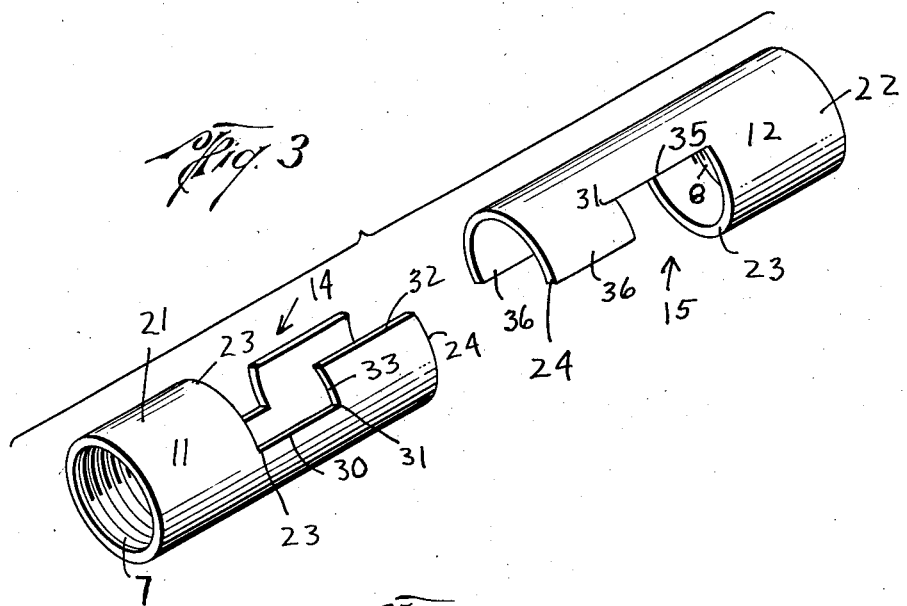
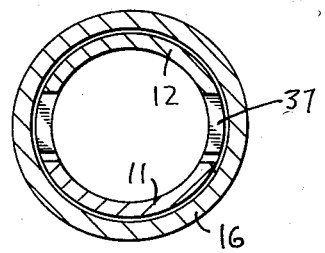
Ralph L. Kerr
INVENTOR.
BY Hayden & Pravel
ATTORNEYS

United States Patent Office 2,890,066
Patented June 9, 1959

2,890,066

NON-ROTATABLE EXPANSION COUPLING

Ralph L. Kerr, Columbus, Tex.

Application August 20, 1956, Serial No. 605,131

2 Claims. (Cl. 285—67)

The present invention relates to a coupling and more particularly to a coupling for connecting the ends of tubular members such as conduit and the like together.

Various type coupling arrangements have been provided and are in use at the present time for connecting the ends of tubular members such as pipe, conduit and the like together so that the connected sections of pipe or conduit may form a line of any suitable length. One form of coupling the adjacent ends of pipe or conduit together is by welding the pipe together; another type of coupling presently in use employs a sleeve which is threaded at each of its ends so as to receive the threaded ends of the pipe or conduit therein.

Both of these forms of couplings, as well as other forms of couplings presently in use have several disadvantages, one of which is that the coupling forms a rigid connection between the pipes it connects together, thereby eliminating any longitudinal movement between the connected pipe sections.

Under some circumstances it may be desirable to connect adjacent ends of tubular members together so that relative longitudinal movement along the tubular members may occur without affecting the connection of the pipe ends to the extent of impairing the connection or breaking it.

The present invention provides a coupling arrangement for connecting sections of tubular members such as pipe, conduit and the like together to form a conduit or pipe line of a desired length. The present invention also contemplates a coupling which may be constructed, if desired, to permit relative longitudinal movement between the adjacent sections of pipe which are coupled together, while maintaining the pipe sections in coupled or connected relationship.

Still another object of the invention is to provide a coupling for connecting the ends of adjacent sections of tubular members together in a fluid tight relationship, which coupling may be connected in a minimum of time with a minimum amount of effort.

Yet a further object of the invention is to provide a coupling for connecting the ends of adjacent tubular members together in a fluid tight relationship, while accommodating longitudinal relative movement between the connected adjacent tubular members, said coupling being constructed and arranged to eliminate members or parts which would normally become fouled-up or become inoperative by corrosion.

Yet a further object of the invention is to provide a coupling for connecting the ends of adjacent tubular members together in a manner so as to permit relative longitudinal movement between the members while maintaining them in a fluid tight relationship, said coupling being constructed and arranged so that it may be easily actuated for coupling and uncoupling the adjacent tubular members together.

Other objects and advantages of the invention will become more readily apparent from consideration of the following description and drawings wherein:

Fig. 1 is a vertical sectional view, partly in elevation, illustrating an embodiment of the invention and showing it as being secured in operative position on the ends of adjacent tubular members;

Fig. 2 is a sectional view on the line 2—2 of Fig. 1 and illustrates the relationship of the coupling members when they are engaged together; and Fig. 3 is an exploded isometric view of the coupling members shown in Fig. 1 of the drawings.

Attention is directed to Fig. 1 of the drawings wherein the invention is illustrated generally by the numeral 2 and is shown as being positioned on adjacent tubular members such as pipes 3 and 4 so as to couple or connect the tubular members 3 and 4 together. As previously mentioned, couplings heretofore used, and those presently in use generally form a rigid connection between adjacent tubular members which inhibits longitudinal relative movement therebetween. Under some circumstances, it may be desirable to couple the members 3 and 4 together so as to accommodate relative longitudinal movement therebetween while maintaining them in a coupled relation.

Also, most coupling arrangements of the prior art are cumbersome in operation and require a great deal of manipulation in order to position the tubular members therein in a fluid tight relationship. Also, the coupling members of the prior art are further undesirable because some of them when exposed to weather corrode to the extent of becoming inoperative, or if left in position between the ends of adjacent coupled members such as the tubular members 3 and 4, they tend to corrode and freeze in such position.

The present invention provides a coupling which may be quickly and easily arranged in operative position for connecting the ends of adjacent sections of members, such as the tubular members 3 and 4 together. The present invention also may be constructed and arranged so as to accommodate relative longitudinal movement between the members which it connects together and the present invention also is constructed and arranged so that it will not become inoperative when subjected to weather conditions for an extensive period of time, and it inhibits freezing or locking of the coupling after it has been in service for some time.

It will be noted that each of the tubular members 3 and 4 is provided with a threaded area 5 and 6, respectively, adjacent the ends thereof which are adapted to engage threaded areas 7 and 8 on the inner periphery 9 and 10 of each of the coupling members 11 and 12. This engages the coupling member 11 on the member 3 and the coupling member 12 on the member 4.

However, it should be understood that any suitable means of engaging the coupling members in position on the tubular members 3 and 4 may be used without departing from the scope of the invention. Furthermore, as illustrated, the coupling members 11 and 12 are illustrated as comprising tubular sections which are hollow for accommodating fluid flow therethrough when they are connected together. However, the exact configuration and shape of the members 11 and 12 may vary without departing from the scope of the present invention. It will be noted that each of the members 11 and 12 is provided with first and second cut-away portions denoted generally as 14 and 15, respectively, such cut-away portions being therefor the end portion of the coupling members 11 and 12 opposite from the threaded areas 7 and 8 thereof respectively.

The cut-away portions 14 and 15 of the coupling members 11 and 12 are identical, but when the members 11 and 12 are positioned on the adjacent tubular members 3 and 4 they will assume the relative position as illustrated in Fig. 3 of the drawings so that when the coupling member 11 is engaged or interfitted with the coupling member 12, they will fit as illustrated in Fig. 1 of the drawings whereby the members 3 and 4 are connected together.

It will be noted that suitable means are provided for maintaining the coupling 2 in a fluid tight relationship relative to the tubular members 3 and 4 and to this end a sleeve 16 is shown as surrounding the interfitting members 11 and 12 and being provided with cylindrical internal portions in which grooves 17 are provided adjacent each of the ends 18 and 19, which grooves are adapted to receive suitable seal means such as the O-ring seals 20 for engaging the third cylindrical circumferentially continuous outer portions, 21 and 22 respectively of the members 11 and 12 for forming a fluid seal therewith.

Therefore, after the members 11 and 12 have been positioned as illustrated in Fig. 1 of the drawings, the sleeve like member 16 may be moved to the position shown in Fig. 1 so as to surround the coupling members 11 and 12 so that the seal means 20 forms a fluid seal between the sleeve like member 16 and the continuous outer portions 21 and 22 of the coupling members 11 and 12 which have not been cut away, thereby forming a fluid seal which inhibits leakage of fluid at the coupling.

As previously mentioned, the first and second cut-aways generally designated as 14 and 15 of each of the members 11 and 12 is substantially identical in arrangement, and attention is directed to Fig. 3 of the drawings wherein the cut-away portion generally designated by the numeral 14 is illustrated as extending from the termination 23 of the continuous outer portion 21 to the end 24 of the coupling member 11.

The cut-away portion 14 is longitudinally extending relative to the coupling member 11 and includes a longitudinally extending second cut-away portion 30 which extends from the termination 23 of the uncut portion 21 to the point 31, as well as a first cut-away portion 32 which extends from the end 31 of the adjacent cut-away portion 30 to the end 24 of the coupling member. The first cut-away portion 32 is in a different longitudinal plane from the cut-way portion 30, thereby forming a transverse shoulder 33.

Since, as previously mentioned, the cut-away portions 14 and 15 are similar in arrangement, the cut-away designated generally at 15 of the coupling member 12 includes the second cut-away portion 35 which is spaced from the end 24 of the coupling member and the first cut-away portion 36 adjacent the end thereof. The first cut-away portion 36 of the coupling member 12 is adapted to fit in the second cut-away portion 30 of the coupling member 11, while the first cut-away portion 32 of the coupling member 11 is adapted to fit in the second cut-away portion 35 of the coupling member 12, thereby locking or engaging the coupling members 11 and 12 together.

It is to be noted that the foregoing construction provides an arrangement which retains the coupling members 11 and 12 and the tubular members 3 and 4 in a non-rotatable relationship. However, if desired, the first and second cut-away portions of the coupling members may be formed so as to accommodate relative longitudinal movement between the memebrs 3 and 4 while maintaining them in coupled relationship. For example, the second cut-away portions 30 and 35 of the coupling members 11 and 12 respectively are longer, or of greater axial extent, than the first cut-away portions 36 and 32 of the coupling members 12 and 11 respectively so that when the first cut-away portion 36 of the coupling member 12 is interfitted in the second cut-way portion 30 of member 11, and when the first cut-away portion 32 of member 11 is interfitted in the second cut-away portion 35 of the member 12 there will be a space between the transverse shoulder 37 on the first cut-away portion 36 of member 12 and the shoulder 33 of the first cut-away portion 32 of member 11, as illustrated in Fig. 1. Also, such construction will provide a spacing between the end 24 of the coupling member 12 and the termination 23 of the third portion 21, of the coupling member 11. This construction provides a means whereby longitudinal relative movement between tubular members 3 and 4 may occur, while maintaining them in an engaged or locked relationship.

While it is believed that the operation of the present invention is apparent by reason of the foregoing description, to further amplify and describe, it will be assumed that the coupling memebrs 11 and 12 are secured in position on the tubular members 3 and 4 and it is desired to secure the tubular members 3 and 4 together. The sleeve 16 may be telescoped over the end of either of the tubular members 3 or 4 and the coupling members 11 and 12 engaged together by interfitting the first cut-away portions 32 and 36 of the coupling members 11 and 12 respectively in the second cut-away portions 35 and 30 of the coupling members 12 and 11 respectively. The sleeve 16 is then moved to surround the members 11 and 12 so that the seal means 20 forms a fluid seal between the sleeve like member 16 and the outer continuous portions 21 and 22 of the coupling members 11 and 12 respectively.

This construction permits relative longitudinal movement to occur between the tubular members 3 and 4 while maintaining the members coupled together in a fluid tight relationship.

When it is desired to disconnect the tubular members 3 and 4 for any reason whatever, it is only necessary to slide the sleeve like member 16 from its sealing engagement with each of the coupling members 11 and 12, whereupon the tubular members 3 and 4 may be disconnected with ease.

Particular attention is directed to the fact that the coupling of the present invention does not include any threads or other mechanism which may tend to become fouled-up or corroded during an extended period of use which would tend to lock or freeze the coupling in position on the tubular members 3 and 4 if left in use for an extended period of time. Also, the construction of the coupling of the present invention is such that it may be subjected to weather conditions for an extended period of time and then placed in immediate use without any unusual or complicated preparation procedures prior to use.

Broadly the present invention relates to a coupling for connecting members together and to a coupling which may be constructed and arranged to accommodate relative longitudinal movement between the connected members, while maintaining them in a fluid tight relationship.

What is claimed is:

1. In a pipe coupling, hollow interconnecting members, said members each having end portions, each of said end portions having first and second cut-away portions disposed longitudinally of the axis of said members, said first portion extending from one end of the members and said second portion extending from the first portion toward the other end of said members, said members also having a third cylindrical circumferentially continuous outer portion, said second cut-away portion being in a different longitudinal plane than said first cut-away portion whereby said first cut-away portion forms a transverse shoulder facing said third portion, and said first and second portions of one member interfitting with second and first portions respectively of the other member and being substantially circumferentially complementary therewith, said second portions of each member being of greater axial extent than said first portions of each member, a sleeve having cylindrical internal portions surrounding said interfitting members and resilient seal means disposed between said cylindrical portions of said sleeve and said third cylindrical portions of said members whereby said members are free to move axially, the outward movement of said interfitting members being limited by engagement of said shoulders of said first portions and prevented from substantial relative rotation and whereby said seal is effective to prevent fluid leakage throughout the axial movement of said interfitting members.

2. The combination recited in claim 1 including means on each of said members for connecting with a pipe.

References Cited in the file of this patent

UNITED STATES PATENTS

| | | |
|---|---|---|
| 309,444 | Dunning | Dec. 16, 1884 |
| 773,047 | Bayles | Oct. 25, 1904 |
| 792,085 | Stuttle | June 13, 1905 |
| 847,472 | Hafer | Mar. 19, 1907 |
| 867,312 | Shutz | Oct. 1, 1907 |
| 949,300 | Massa | Feb. 15, 1910 |
| 1,714,803 | Mueller | May 28, 1929 |
| 1,839,682 | Lamb | Jan. 5, 1932 |
| 2,146,641 | McWane | Feb. 7, 1939 |
| 2,235,189 | Wuestner | Mar. 18, 1941 |
| 2,257,321 | Arnold | Sept. 30, 1941 |
| 2,296,993 | Gerry | Sept. 29, 1942 |
| 2,479,104 | Dreyer | Aug. 10, 1949 |
| 2,759,745 | La Mar | Aug. 21, 1956 |
| 2,822,191 | Risley | Feb. 4, 1958 |

FOREIGN PATENTS

| | | |
|---|---|---|
| 290,830 | Great Britain | May 24, 1928 |
| 913,833 | France | Sept. 20, 1946 |